US010946498B2

(12) United States Patent
Mao et al.

(10) Patent No.: US 10,946,498 B2
(45) Date of Patent: Mar. 16, 2021

(54) METHOD AND SYSTEM FOR MACHINING, AND A ROBOT SYSTEM

(71) Applicant: ABB Schweiz AG, Baden (CH)

(72) Inventors: Lei Mao, Shanghai (CN); Shaojie Cheng, Shanghai (CN); Diamond Daimeng Dong, Shanghai (CN)

(73) Assignee: ABB Schweiz AG, Baden (CH)

( * ) Notice: Subject to any disclaimer, the term of this patent is extended or adjusted under 35 U.S.C. 154(b) by 191 days.

(21) Appl. No.: 15/567,404

(22) PCT Filed: Nov. 10, 2015

(86) PCT No.: PCT/CN2015/094177
§ 371 (c)(1),
(2) Date: Oct. 18, 2017

(87) PCT Pub. No.: WO2017/079892
PCT Pub. Date: May 18, 2017

(65) Prior Publication Data
US 2018/0141184 A1 May 24, 2018

(51) Int. Cl.
B24B 51/00 (2006.01)
B24B 49/00 (2012.01)
(Continued)

(52) U.S. Cl.
CPC ............. B24B 51/00 (2013.01); B24B 9/00 (2013.01); B24B 27/0038 (2013.01);
(Continued)

(58) Field of Classification Search
CPC ......... B24B 9/00; B24B 49/006; B24B 49/02; B24B 51/00
See application file for complete search history.

(56) References Cited

U.S. PATENT DOCUMENTS 4,054,010 A * 10/1977 Shipman ................. B24B 9/00
257/E21.237
4,777,769 A * 10/1988 McLaughlin ........... B24B 49/12
451/5
(Continued)

FOREIGN PATENT DOCUMENTS

CA 2407248 A1 11/2001
CN 1426342 A 6/2003
(Continued)

OTHER PUBLICATIONS

Chinese Office Action, Chinese Patent Application No. 2015800757616, dated Jan. 8, 201, 11 pages including English translation.
(Continued)

Primary Examiner — Orlando E Aviles
Assistant Examiner — Joel D Crandall
(74) Attorney, Agent, or Firm — Taft Stettinius & Hollister LLP

(57) ABSTRACT

The present invention discloses a method and system for machining a work piece by a machining tool, and a robot system using the same. The method comprises: defining a customized contact point on the machining tool by setting a contact point height of the machining tool; moving the machining tool against the work piece to apply predefined machining feeds. Compared with the existing prior arts, the proposed method and system improves machining efficiency and accuracy. With the method and system according to the present disclosure, high machining efficiency could be achieved as well as collisions could be avoided.

10 Claims, 6 Drawing Sheets

(51) Int. Cl.
  *B24B 49/02*  (2006.01)
  *B24B 27/00*  (2006.01)
  *B24B 9/00*  (2006.01)
  *B25J 9/16*  (2006.01)
  *G05B 19/4093* (2006.01)
  *G05B 19/416*  (2006.01)

(52) U.S. Cl.
  CPC ......... *B25J 9/1666* (2013.01); *G05B 19/4093* (2013.01); *G05B 19/4163* (2013.01); *G05B 2219/35158* (2013.01); *G05B 2219/43031* (2013.01); *G05B 2219/49077* (2013.01); *G05B 2219/49088* (2013.01); *G05B 2219/49103* (2013.01); *G05B 2219/49149* (2013.01); *G05B 2219/49157* (2013.01); *G05B 2219/50285* (2013.01); *G05B 2219/50339* (2013.01)

(56) References Cited

U.S. PATENT DOCUMENTS

| | | | | |
|---|---|---|---|---|
| 4,894,597 | A * | 1/1990 | Ohtomi | B24B 9/00 318/568.22 |
| 4,897,586 | A | 1/1990 | Nakata et al. | |
| 5,126,645 | A * | 6/1992 | Yoshimi | G05B 19/18 318/568.11 |
| 5,184,428 | A * | 2/1993 | Feldt | B24B 47/22 250/229 |
| 5,668,453 | A * | 9/1997 | Muto | B25J 9/1679 318/568.17 |
| 5,827,020 | A * | 10/1998 | Fujita | G05B 19/4163 409/80 |
| 6,439,961 | B1 * | 8/2002 | Hammond | B23C 3/12 451/5 |
| 6,478,657 | B1 * | 11/2002 | Shibata | B24B 9/148 451/255 |
| 8,784,155 | B2 * | 7/2014 | Guo | B24B 41/02 451/150 |
| 8,882,566 | B2 * | 11/2014 | Okamura | B24B 9/00 451/49 |
| 9,056,385 | B2 * | 6/2015 | Nishide | B24B 19/06 |
| 9,561,572 | B2 * | 2/2017 | Takeichi | B24B 51/00 |
| 10,150,200 | B2 * | 12/2018 | Ueda | B24B 27/0084 |
| 2013/0317646 | A1 * | 11/2013 | Kimoto | B25J 9/1651 700/250 |
| 2014/0113525 | A1 * | 4/2014 | Chan | G05B 19/19 451/5 |
| 2018/0056480 | A1 * | 3/2018 | Tegoeh | B24B 49/003 |
| 2018/0161952 | A1 * | 6/2018 | Gu | B24B 9/00 |
| 2018/0281138 | A1 * | 10/2018 | Cheng | B23C 3/12 |

FOREIGN PATENT DOCUMENTS

| | | |
|---|---|---|
| CN | 101774048 A | 7/2010 |
| CN | 103302752 A | 9/2013 |
| CN | 103311114 A | 9/2013 |
| CN | 104249195 A | 12/2014 |
| CN | 104972362 A | 10/2015 |
| DE | 102011086051 A1 | 7/2013 |
| EP | 0421618 A2 | 4/1991 |
| JP | H07-132435 A | 5/1995 |
| WO | 2017054130 A1 | 4/2017 |

OTHER PUBLICATIONS

Chinese Search Report, Chinese Patent Application No. 2015800757616, dated Dec. 21, 2018, 5 pages including English translation.
International Search Report and Written Opinion, PCT/CN2015/094177, ABB Technology Ltd. et al., dated Jul. 28, 2016, 8 pages.
European Extended Search Report dated Jun. 16, 2019 issued in EP Application No. 15908022.5 (9 pages).
Chinese Office Action dated Jun. 4, 2019 issued in CN Application No. 201580075761.6 (8 pages).
Chinese Search Report dated May 10, 2019 issued in CN Application No. 201580075761.6 (4 pages).
Chinese Office Action dated Oct. 8, 2019 issued in CN Application No. 201580075761.6 (9 pages).
Chinese Search Report dated Aug. 23, 2019 issued in Cn Application No. 201580075761.6 (4 pages).

* cited by examiner

METHOD AND SYSTEM FOR MACHINING, AND A ROBOT SYSTEM

FIELD OF THE INVENTION

The present invention relates to a method and system for machining, and more particularly, to a method for machining a work piece with a tool and a robot system using the same.

BACKGROUND OF THE INVENTION

In modern machining, more and more work pieces tend to have free-form surfaces or boundaries, which brings a lot of challenges to handle. While in most applications such as deburring, side-machining, the tips of the machining tools are in a revolving shape and different radii in different heights are usually used, as shown in FIG. 1.

Generally, a fixed point or part of a machining tool is programmed to work along the whole tool path during the machining process. This means that the contact point is fixed and unavailable for customization. To change the contact point on the machining tool for a specific path, users have to manually modify the point, which is low in both efficiency and accuracy. In addition, for the feed rate in the machining process, although it is related to the contact point on the tool with different contact diameters, users have to specify it separately.

Therefore given the above information, it will be appreciated that using default and fixed contact point on a tool in the machining process may cause the following problems.

Firstly, low machining efficiency. Generally, the machining efficiency is proportional to the tool diameter. The larger the cutter diameter is, the higher the machining efficiency is achieved. In the cases that have no collisions, users prefer to use as larger contact diameter as possible during the machining, and as a result they would like to customize the contact point on the tool to achieve higher machining efficiency. Relatively, using fixed contact point will bring low machining efficiency.

Secondly, gouge or collision may exist between the machining tool and the work piece in the case of a normal path which is generated by offline programming. In some cases, as can be seen in FIG. 2, there may be an extremely large curvature change along the path. Then, the machining tool will gouge the work piece at the points where the radius of the tool contact point (Rtool) is larger than the radium of the work piece (Rpart). While in some other cases, as can be seen in FIG. 3, an obstacle below the path may exist so that collision will exist in some parts of the path.

To resolve the preceding problems, there is a need in the art to develop an improved method for machining a work piece with a tool.

SUMMARY OF THE INVENTION

The object of the present invention is to provide a novel method and system for machining a work piece by a machining tool, and a robot system using the same, to improve machining efficiency and accuracy. With this solution, high machining efficiency could be achieved as well as collisions could be avoided.

According to one aspect of the invention, there is provided a method for machining a work piece by a machining tool, comprising: defining a customized contact point on the machining tool by setting a contact point height of the machining tool; moving the machining tool against the work piece to apply predefined machining feeds.

According to a preferred embodiment of the present invention, checking a feasibility of the contact point height in a virtual environment, to make sure there is no gouge or collision in its machining path; adjusting the contact point height if failing to pass the checking.

According to a preferred embodiment of the present invention, the contact point height is configured to be changeable in one machining path.

According to a preferred embodiment of the present invention, controlling the feed rate of the machining tool to be constant when changing the contact point height of the machining tool.

According to a preferred embodiment of the present invention, the machining tool is in a revolving shape.

According to a preferred embodiment of the present invention, the present description discloses generating a default contact diameter (CDdefault) of the machining tool; generating a default movement speed (MSdefault) of the machining tool; generating a default revolution speed of spindle (RSdefault) of the machining tool; calculating the actual contact diameter (CDactual) in accordance with the customized contact point; modifying the actual revolution speed of spindle (RSactual) and/or the actual movement speed (MSactual), such that the feed rate may remain unchanged.

According to a preferred embodiment of the present invention, modifying the actual revolution speed of spindle $(RS_{actual})$ into $(CD_{default}/CD_{actual})*RS_{default}$, if the actual movement speed $(MS_{actual})$ remains the same.

According to a preferred embodiment of the present invention, modifying the actual movement speed $(MS_{actual})$ into $(CD_{default}-CD_{actual})*RS_{default}/2+MS_{default}$, if the actual revolution speed of spindle $(RS_{actual})$ remains the same.

According to a preferred embodiment of the present invention, modifying the actual revolution speed of spindle $(RS_{actual})$ and the actual movement speed $(MS_{actual})$, to meet the following equation: $RS_{default}*CD_{default}/2+MS_{default}=RS_{actual}*CD_{actual}/2+MS_{actual}$.

According to another aspect of the invention, there is provided a robot system for machining a work piece, including: a manipulator; a machining tool; and a controller, being adapted for controlling the manipulator to operate the machining tool according to the method as described above.

According to another aspect of the invention, there is provided a system for machining a work piece by a machining tool, comprising: a height defining module, configured to define a customized contact point on the machining tool by setting a contact point height of the machining tool; a tool moving module, configured to move the machining tool against the work piece to apply predefined machining feeds.

According to a preferred embodiment of the present invention, the system further comprises: a collision checking module, configured to check a feasibility of the contact point height in a virtual environment, to make sure there is no gouge or collision in its machining path; a height adjusting module, configured to adjust the contact point height if failing to pass the checking.

According to a preferred embodiment of the present invention, the contact point height is configured to be changeable in one machining path.

According to a preferred embodiment of the present invention, the system further comprises: a feed rate controlling module, configured to control the feed rate of the machining tool to be constant when changing the contact point height of the machining tool.

According to a preferred embodiment of the present invention, the machining tool is in a revolving shape.

According to a preferred embodiment of the present invention, the system further comprises: a contact diameter generating module, configured to generate a default contact diameter ($CD_{default}$) of the machining tool; a movement speed generating module, configured to generate a default movement speed ($MS_{default}$) of the machining tool; a revolution speed generating module, configured to generate a default revolution speed of spindle ($RS_{default}$) of the machining tool; a calculating module, configured to calculate the actual contact diameter ($CD_{actual}$) in accordance with the customized contact point; a modifying module, configured to modify the actual revolution speed of spindle ($RS_{actual}$) and/or the actual movement speed ($MS_{actual}$), to remain the feed rate unchanged.

According to a preferred embodiment of the present invention, the modifying module is configured to modify the actual revolution speed of spindle ($RS_{actual}$) into ($CD_{default}/CD_{actual}$)*$RS_{default}$, if the actual movement speed ($MS_{actual}$) remains the same.

According to a preferred embodiment of the present invention, the modifying module is configured to modify the actual movement speed ($MS_{actual}$) into ($CD_{default}-CD_{actual}$)*$RS_{default}$/2+$MS_{default}$, if the actual revolution speed of spindle ($RS_{actual}$) remains the same.

According to a preferred embodiment of the present invention, the modifying module is configured to modify the actual revolution speed of spindle ($RS_{actual}$) and the actual movement speed ($MS_{actual}$), to meet the following equation: $RS_{default}*CD_{default}/2+MS_{default}=RS_{actual}*CD_{actual}/2+MS_{actual}$.

Compared with the existing prior art, the present invention can achieve several advantages (as noted further hereinbelow) by using the new solution of flexible contact point, and more particularly by using the auto-adaptive feed rate The present invention is easy to improve efficiency of machining by adjusting the contact height.

The present invention can provide more available options for avoiding gouges and collisions on the path and able to use different contact points for a machining tool.

The present invention can increase offline programming efficiency, and it can also provide more flexible tool path and more reasonable feed rate.

The present invention can avoid tool change and reduce cycle time.

The present invention can improve the machining accuracy.

Other features and advantages of embodiments of the present application will also be understood from the following description of specific exemplary embodiments when read in conjunction with the accompanying drawings, which illustrate, by way of example, the principles of the invention.

BRIEF DESCRIPTION OF THE DRAWINGS

The above and other features of the present disclosure will become more apparent through detailed explanation on the embodiments as illustrated in the description with reference to the accompanying drawings, throughout which like reference numbers represent same or similar components and wherein.

DETAILED DESCRIPTION OF PREFERRED EMBODIMENTS

Hereinafter, solutions as provided the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

Generally, all terms used in the claims are to be interpreted according to their ordinary meaning in the technical field, unless explicitly defined otherwise herein. All references to "a/an/the/said [element, device, component, means, step, etc]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

In general, embodiments of the present application provide a new method and system for machining a work piece by a machining tool. As will be apparent from the further discussions below, the ability to provide flexible contact point enables users to customize a contact point on a machining tool based on actual requirements so that high machining efficiency could be achieved as well as gouges or collisions could be avoided.

Throughout the descriptions of various embodiments of the present application, repeated descriptions of some similar elements will be omitted.

Figure 1:
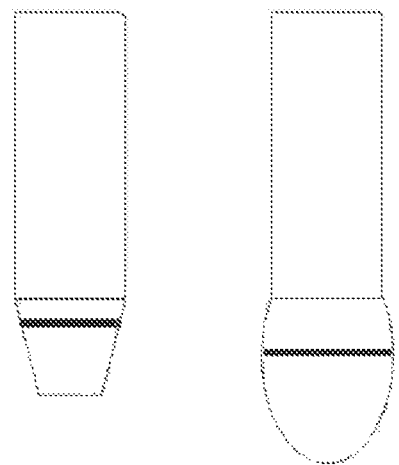
FIG. 1 shows a section view of two different conventional machining tools.
Figure 2:
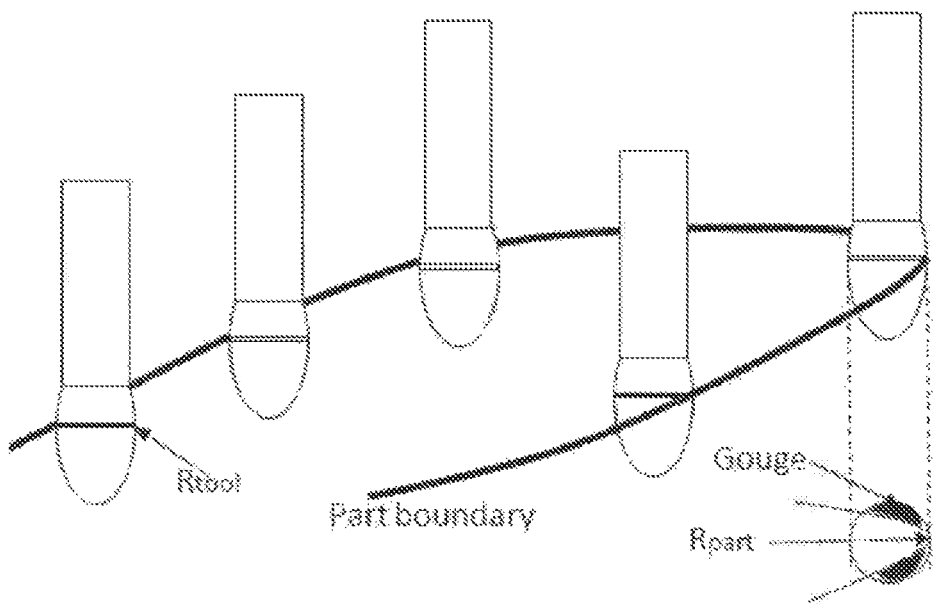
FIG. 2 shows a first schematic diagram of a conventional tool path of a machining tool.
Figure 3:
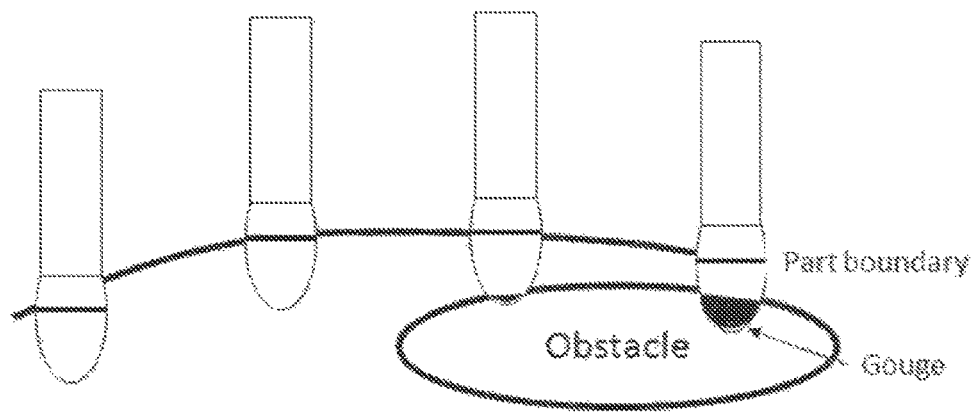
FIG. 3 shows a second schematic diagram of a conventional tool path of a machining tool.
Figure 4:
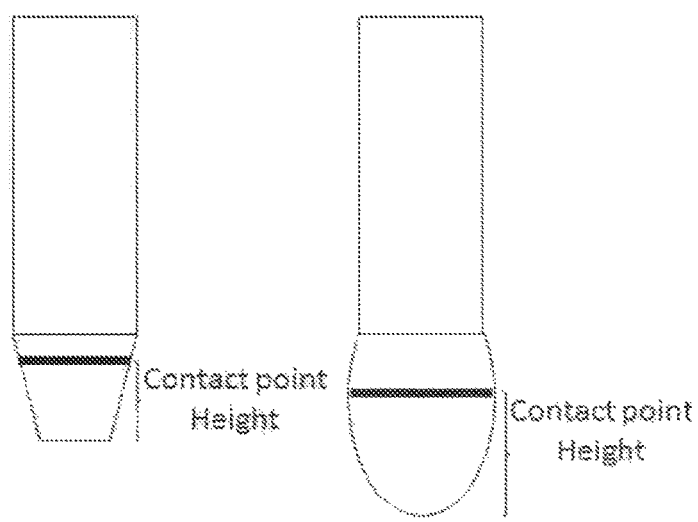
FIG. 4 shows a section view of two different machining tools according to an embodiment of the present disclosure.

Next, reference will be made to describe an example of machining a work piece by the machining tool in which the first embodiment of the present disclosure can be implemented. FIG. 4 is a section view of two different machining tools which the present invention can apply to. During the machining process, the machining tool relatively moves against the work piece to apply machining feeds therebetween. Namely the machining tool moves while the work piece keeps still, or the work piece moves while the machining tool keeps still. For example, the tool is shaped like a circular truncated cone or an ellipsoid, as can be seen in FIG. 4. In these situations, the machining tool can take the form of a solid of revolution. But it should be noted that the present disclosure is not limit in this regard. Then, a primary motion is provided by rotating the machining tool around its axis and the rotating machining tool removes the material from the contact points at the work piece to generate a desired shape, such as deburring and side-machining. The feed motion is achieved by relative motion of the machining tool and the work piece.

To overcome the above-mentioned shortcomings of using default and fixed contact point, except for the parameters related to the machining tool shape, another parameter contact point height can also be introduced for defining a customized contact point on the tool, as it can be seen in FIG. 4. When the contact height is set for a machining tool, the contact point is certainly defined. Then, the offline programming will use the point to contact and work on the work piece and use the normal of the point to calculate the relative posture for the machining target.

With this solution, users can define a customized contact point on the machining tool by setting a contact point height of the machining tool, and then move the machining tool against the work piece to apply predefined machining feeds.

In addition, a feasibility of the contact point height can be checked in a virtual environment, to make sure there is no gouge or collision in its machining path. User can adjust the contact point height if failing to pass the checking.

Figure 5:
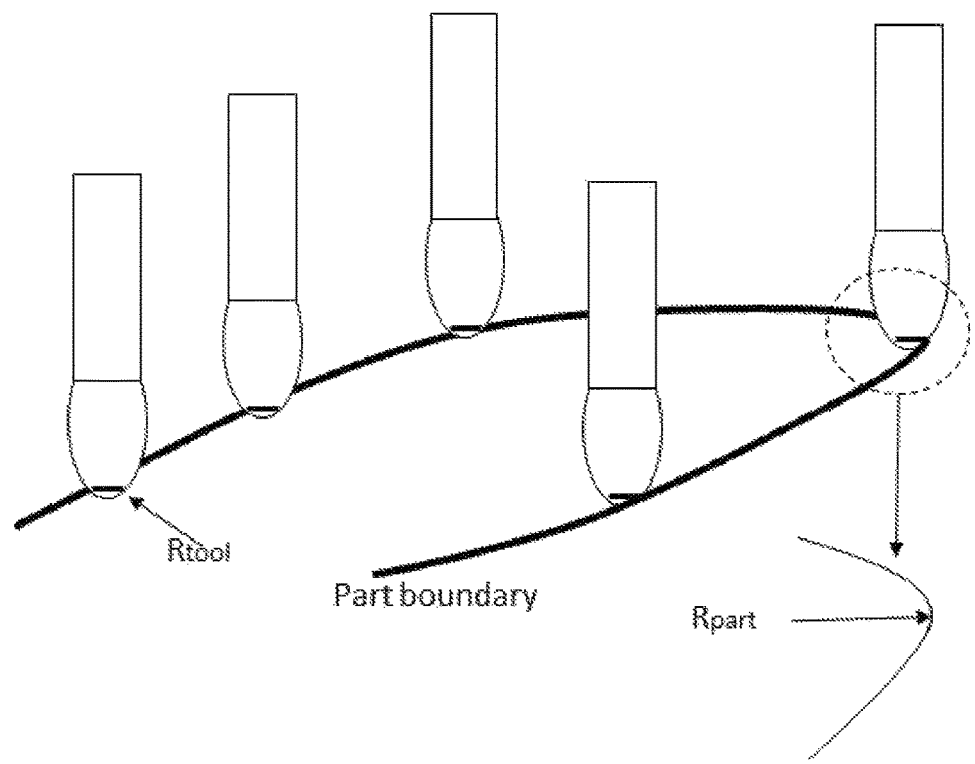
FIG. 5 shows a schematic diagram of machining a work piece by the machining tool according to a first embodiment of the present disclosure.

As shown in FIG. 5, there is an extremely large curvature change along the path because of the large curvature change of the work piece boundary. With the default contact point height, the machining tool will gouge the work piece at the points where the radius of the tool contact point (Rtool) is larger than the radium of the part (Rpart). When a lower contact height is set, a smaller contact diameter could be set so that the gouge could be eliminated.

Figure 6:
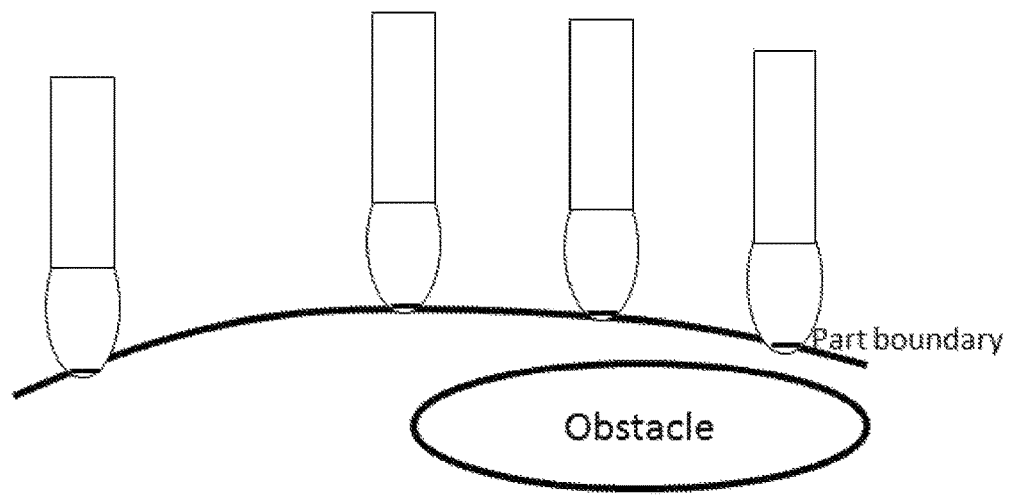
FIG. 6 shows a schematic diagram of machining a work piece by the machining tool according to a second embodiment of the present disclosure.

Another example is shown in FIG. 6. An obstacle is close to the machining path, so collision will exist in some parts of the path with the default contact point height. When a lower contact height is set, a smaller contact diameter could be set so that the collisions with obstacles could be eliminated.

Figure 7:
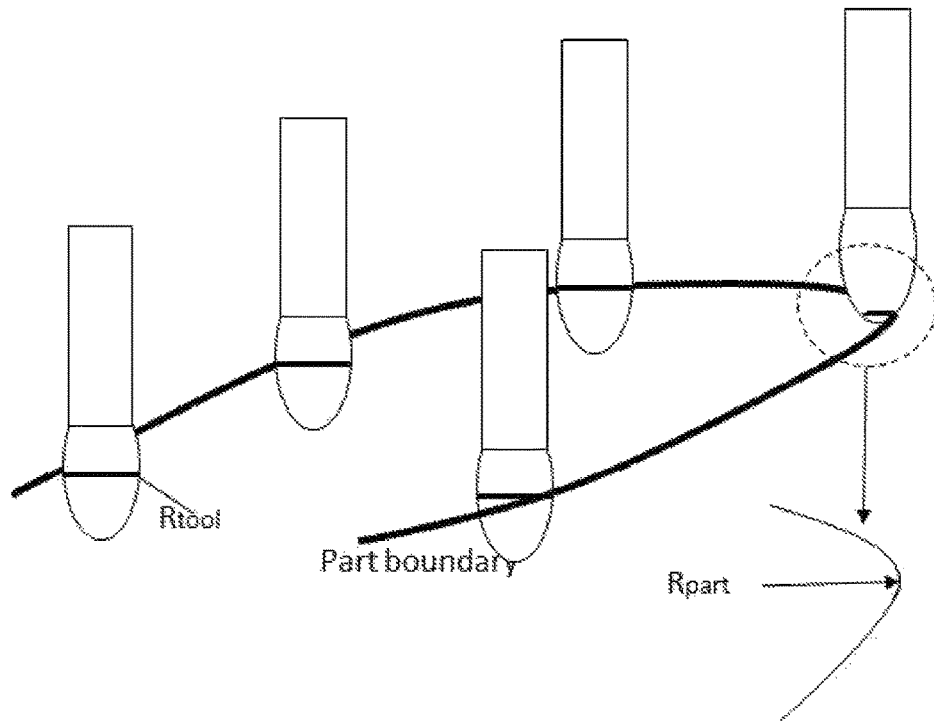
FIG. 7 shows a schematic diagram of machining a work piece by the machining tool according to a third embodiment of the present disclosure.
Figure 8:
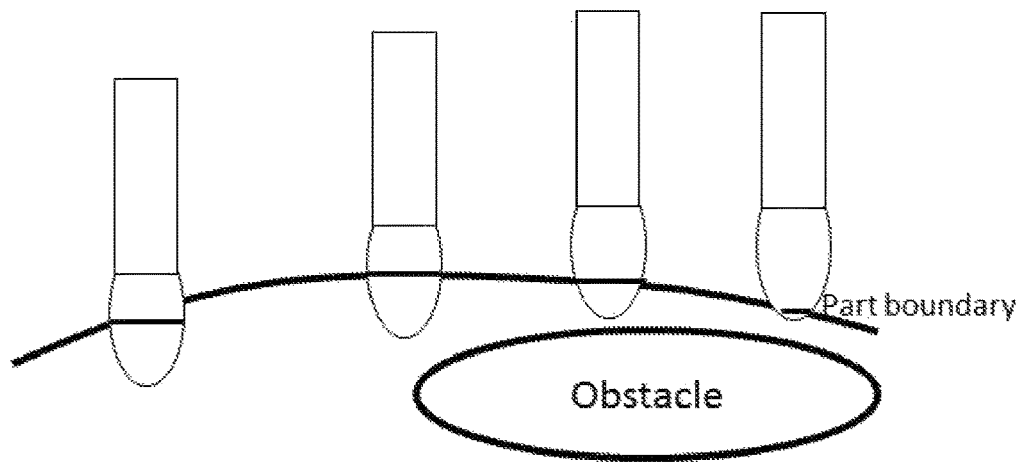
FIG. 8 shows a schematic diagram of machining a work piece by the machining tool according to a fourth embodiment of the present disclosure.

According to the common knowledge of users, the machining efficiency is proportional to the tool diameter. The larger the cutter diameter is, the higher the machining efficiency is achieved. In the cases that have no collisions, users prefer to use as large of a contact diameter as possible during the machining, so that they would like to set adaptive contact point in one machining path to achieve higher machining efficiency. For example, as seen in FIGS. 7 and 8, the contact point height can be changeable in one machining path. User can set lower contact height for a special purpose to avoid gouges and collisions in partial machining path, but using a larger contact diameter along the rest of the path to achieve high machining efficiency.

Therefore, the present disclosure is advantageous because it is easy to improve machining efficiency of machining by adjusting the contact height according to different environment. Also, the present disclosure provides more options for avoiding gouges and collisions on the machining path and is able to use different contact points for a tool. So it can increase offline programming efficiency and make tool path more flexible and feed rate more reasonable.

In addition, auto-adaptive feed rate is also introduced to better resolve the preceding problems.

According to another embodiment of the present invention, auto-adaptive feed rate is introduced together with the contact point and enables automatic calculation of proper feed rates based on different contact points. With this solution by binding the feed rate with contact height, the machining accuracy becomes better than that using the same feed rate regardless of contact height. This could also reduce programming time since users do not need to set the feed rate manually.

In some embodiments, two parameters Movement Speed and Revolution Speed of Spindle are introduced to represent two feed rate states as shown in Table 1.

TABLE 1

| Default Contact diameter and default feed rate | | |
|---|---|---|
| Default Contact | Default Feed Rate | |
| diameter | Movement Speed | Revolution speed of spindle |
| $CD_{default}$ | $MS_{default}$ | $RS_{default}$ |

Users first specify a default feed rate for a default contact diameter which is calculated based on the tool shape and contact height parameters, so that the default parameter values are obtained.

The basic idea of auto-adaptive feed rate is keep a measure of velocity the same when the tool makes contact with the work piece. Generally, there are three available strategies for automatic calculating the feed rate.

Firstly, as shown in Table 2, user can keep move speed unchangeable, but only adjust revolution speed of spindle as described in Table 2.

TABLE 2

| Keep move speed | | |
|---|---|---|
| Actual Contact | Actual Feed Rate | |
| diameter | Movement Speed | Revolution speed of spindle |
| $CD_{actual}$ | $MS_{default}$ | $(CD_{default}/CD_{actual}) * RS_{default}$ |

Secondly, as shown in Table 3, user can keep revolution speed of spindle unchangeable, but only adjust move speed as described in Table 3.

TABLE 3

| Keep revolution speed of spindle | | |
|---|---|---|
| Actual Contact | Actual Feed Rate | |
| diameter | Movement Speed | Revolution speed of spindle |
| $CD_{actual}$ | $((CD_{default} - CD_{actual}) * RS_{default}/2 + MS_{default}$ | $RS_{default}$ |

Thirdly, user can modify the actual revolution speed of spindle ($RS_{actual}$) and the actual movement speed ($MS_{actual}$) at the same time, so as to meet the following equation: $RS_{default}*CD_{default}/2+MS_{default}=RS_{actual}*CD_{actual}/2+MS_{actual}$.

Users may use tools with different contact heights (namely different contact diameters) in process, then the feed rate of machining target can be automatically calculated by the three strategies as described above.

Therefore, the present disclosure is advantageous because users can control the feed rate of the machining tool to be adaptive or constant when changing the contact point height of the machining tool. Thus, the machining accuracy becomes better compared with the same movement speed and same revolution speed of spindle.

Figure 9:
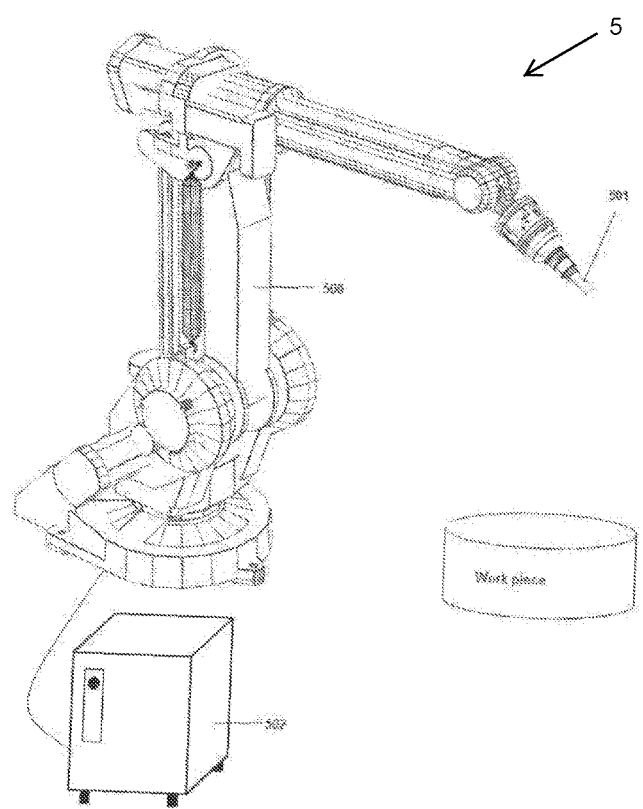
FIG. 9 illustrates a robot system performing the machining process according to an embodiment of present invention.

FIG. 9 illustrates a robot system performing the machining process according to an embodiment of the present invention. The robot system 5 includes a manipulator 500, a machining tool 501 and a controller 502. The manipulator 500 is arranged to hold the machining tool 501. The controller 502 can be offline programmed to control the manipulator 500 to operate the machining tool 501 according to the method as described above.

Another embodiment of the present application will be further discussed below. A system for controlling a machining of a work piece is also provided. The system comprises: a height defining module, which can define a customized contact point on the machining tool by setting a contact point height of the machining tool; and a tool moving module, which can move the machining tool against the work piece to apply predefined machining feeds.

In some embodiments, the system further comprises: a collision checking module, which can check a feasibility of the contact point height in a virtual environment, to make sure there is no gouge or collision in its machining path; and a height adjusting module, which can adjust the contact point height if failing to pass the checking.

In some embodiments, the contact point height may be changeable in one machining path.

In some embodiments, the system further comprises: a feed rate controlling module, which can control the feed rate of the machining tool to be constant when changing the contact point height of the machining tool.

In some embodiments, the machining tool is in a revolving shape.

In some embodiments, a system is disclosed herein which includes the following: a contact diameter generating module, which can generate a default contact diameter (CDdefault) of the machining tool; a movement speed generating module, which can generate a default movement speed (MSdefault) of the machining tool; a revolution speed generating module, which can generate a default revolution speed of spindle (RSdefault) of the machining tool; a calculating module, which can calculate the actual contact diameter (CDactual) in accordance with the customized contact point; a modifying module, which can modify the actual revolution speed of spindle (RSactual) and/or actual movement speed (MSactual), to remain the feed rate unchanged.

In some embodiments, the modifying module can modify the actual revolution speed of spindle ($RS_{actual}$) into ($CD_{default}/CD_{actual}$)*$RS_{default}$, if the actual movement speed ($MS_{actual}$) remains the same.

In some embodiments, the modifying module can modify the actual movement speed ($MS_{actual}$) into ($CD_{default}-CD_{actual}$)*$RS_{default}/2+MS_{default}$, if the actual revolution speed of spindle ($RS_{actual}$) remains the same.

In some embodiments, the modifying module can modify the actual revolution speed of spindle ($RS_{actual}$) and the actual movement speed ($MS_{actual}$), to meet the following equation: $RS_{default}*CD_{default}/2+MS_{default}=RS_{actual}*CD_{actual}/2+MS_{actual}$.

It should be appreciated that the features as described above with reference to FIGS. 4-8 are all applicable to the system. Moreover, the components of the system may be a hardware module or a software unit module. For example, in some embodiments, the system may be implemented partially or completely with software and/or firmware, for example, implemented as a computer program product embodied in a computer readable medium. Alternatively or additionally, the system may be implemented partially or completely based on hardware, for example, as an integrated circuit (IC), an application-specific integrated circuit (ASIC), a system on chip (SOC), a field programmable gate array (FPGA), and so forth. The scope of the present disclosure is not limited in this regard.

Hereinabove, embodiments of the present disclosure have been described in details through embodiments with reference to the accompanying drawings. It should be appreciated that, while this specification contains many specific implementation details, these details should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

The invention claimed is:

1. A method for machining a work piece by a machining tool, comprising:
    defining a customized contact point from among a plurality of potential contact points on the machining tool by setting a contact point height of the machining tool, the machining tool having a variable contact diameter along an axial length of the machine tool and having a revolving shape, the plurality of potential contact points representing varying contact diameters;
    in response to defining the customized contact point, adjusting at least one of a spindle speed of the machine tool and a relative movement speed between the machine tool and the work piece;
    moving the machining tool against the work piece to apply machining feeds as a result of the adjusting;
    controlling the feed rate of the machining tool to be constant when the contact point height of the machining tool is changed as a result of defining a new customized contact point;
    generating a default contact diameter ($CD_{default}$) of the machining tool;
    generating a default movement speed ($MS_{default}$) of the machining tool;
    generating a default revolution speed of a spindle ($RS_{default}$) of the machining tool;

calculating an actual contact diameter ($CD_{actual}$) in accordance with the customized contact point; and modifying an actual movement speed ($MS_{actual}$) into ($CD_{default}-CD_{actual})*RS_{default})/2+MS_{default}$, if the actual revolution speed of the spindle ($RS_{actual}$) remains the same after defining a new customized contact point, while a feed rate remains unchanged after defining a new customized contact point.

2. The method according to claim 1, which further comprises:

checking a feasibility of the contact point height in a virtual environment, to make sure there is no gouge or collision in a machining path of the machine tool; and adjusting the contact point height if the checking a feasibility determines there is a gouge or collision in the machining path of the machine tool.

3. The method according to claim 1, wherein:

the contact point height is configured to be changeable in one machining path.

4. A system for machining a work piece by a machining tool, comprising a controller adapted to:

define a customized contact point on the machining tool by setting a contact point height of the machining tool, the machining tool having a revolving shape;

move the machining tool against the work piece to apply predefined machining feeds;

control the feed rate of the machining tool to be constant when changing the contact point height of the machining tool;

generate a default contact diameter ($CD_{default}$) of the machining tool;

generate a default movement speed ($MS_{default}$) of the machining tool;

generate a default revolution speed of the spindle ($RS_{default}$) of the machining tool;

calculate an actual contact diameter ($CD_{actual}$) in accordance with the customized contact point; and modify an actual revolution speed of the spindle ($RS_{actual}$) and an actual movement speed ($MS_{actual}$), to remain the feed rate unchanged, to meet the following equation:

$RS_{default}*CD_{default}/2+NS_{default}*CD_{actual}/2+MS_{actual}$.

5. The system according to claim 4 wherein, the controller is further adapted to:

check a feasibility of the contact point height in a virtual environment, to make sure there is no gouge or collision in a machining path of the machine tool; and adjust the contact point height if the collision checking module determines an infeasibility of the contact height.

6. The system according to claim 4, wherein:

the contact point height is configured to be changeable in one machining path.

7. A method for machining a work piece by a machining tool, comprising:

defining a customized contact point on the machining tool by setting a contact point height of the machining tool, the machining tool having a variable contact diameter along an axial length of the machine tool;

moving the machining tool against the work piece to apply machining feeds; and varying the contact point height along a machining path on the work piece such that the variable contact diameter changes along the machining path to avoid one of gouging the work piece within a radius thereof and colliding with an obstacle.

8. The method according to claim 7, wherein:

the contact point height is set to a smaller contact diameter of the machining tool within the radius of the work piece or adjacent the obstacle, and the contact point height is set to a larger contact diameter of the machining tool along a portion of the work piece away from the radius of the work piece or the obstacle.

9. The method according to claim 7, wherein:

the contact point height is set to a smaller contact diameter of the machining tool within the radius of the work piece to avoid gouging the work piece, and the contact point height is set to a larger contact diameter of the machining tool along a portion of the work piece away from the radius of the work piece, the smaller contact diameter being smaller than the radius and the larger contact diameter being larger than the radius.

10. The method according to claim 7, wherein:

the contact point height is set to a shorter contact height adjacent the obstacle to avoid colliding with the obstacle, and the contact point height is set to a longer contact height along a portion of the work piece away from the obstacle, the shorter contact height having a smaller contact diameter and the longer contact height having a larger contact diameter.

* * * * *